US010888194B1

(12) United States Patent
Hammack

(10) Patent No.: US 10,888,194 B1
(45) Date of Patent: Jan. 12, 2021

(54) KETTLE GRILL HEAT DISPERSION UNIT

(71) Applicant: Michael D. Hammack, Cove, TX (US)

(72) Inventor: Michael D. Hammack, Cove, TX (US)

(*) Notice: Subject to any disclaimer, the term of this patent is extended or adjusted under 35 U.S.C. 154(b) by 291 days.

(21) Appl. No.: 15/846,281

(22) Filed: Dec. 19, 2017

Related U.S. Application Data

(60) Provisional application No. 62/436,076, filed on Dec. 19, 2016.

(51) Int. Cl.
*A47J 37/07* (2006.01)
*A47J 36/02* (2006.01)

(52) U.S. Cl.
CPC ........... *A47J 37/0786* (2013.01); *A47J 36/02* (2013.01)

(58) Field of Classification Search
CPC ............................ C12N 5/0606; C12N 5/0653
See application file for complete search history.

(56) References Cited

U.S. PATENT DOCUMENTS

| | | | |
|---|---|---|---|
| 3,033,191 A * | 5/1962 | Bonadiman | A47J 37/06 126/25 B |
| 3,191,556 A | 6/1965 | Hottenroth et al. | |
| 3,318,300 A * | 5/1967 | Witty | A47J 37/0786 126/25 C |
| 3,617,693 A | 11/1971 | Shimosawa | |
| 4,481,408 A | 11/1984 | Scheufler | |
| 4,510,916 A | 4/1985 | Ogden | |
| 5,154,159 A | 10/1992 | Knafelc et al. | |
| 6,196,120 B1 | 3/2001 | Reames | |
| D563,739 S | 3/2008 | Shamoon | |
| D671,363 S | 11/2012 | Parel et al. | |
| 9,861,231 B2 * | 1/2018 | Kim | A47J 37/06 |

* cited by examiner

*Primary Examiner* — John C Hong
(74) *Attorney, Agent, or Firm* — Cramer Patent & Design, PLLC; Aaron R. Cramer

(57) ABSTRACT

A kettle grill heat dispersion device provides a grill insert particularly shaped for placement within an existing kettle-type outdoor grill. A circular top plate having a center cup-shaped cylinder is positioned under the upper cooking rack portion of the outdoor grill. A fuel such as charcoal may be positioned within the center cylinder or beneath the circular plate to enable respective direct and indirect cooking of food stuffs correspondingly positioned upon the cooking rack.

3 Claims, 4 Drawing Sheets

KETTLE GRILL HEAT DISPERSION UNIT

RELATED APPLICATIONS

The present invention is a continuation of, was first described in and claims the benefit of U.S. Provisional Application No. 62/436,076 filed Dec. 19, 2016, the entire disclosures of which are incorporated herein by reference.

FIELD OF THE INVENTION

The present invention relates generally to the field of barbeque grill accessories and more specifically relates to kettle grill heat dispersion devices.

BACKGROUND OF THE INVENTION

A barbeque grill is a device that cooks food by applying heat from below. There are several varieties of grills, with most falling into one (1) of two (2) categories: gas-fueled or charcoal. There is debate over which method yields superior results.

Charcoal grills use either charcoal briquettes or all-natural lump charcoal as their fuel source. When burned, the charcoal will transform into embers radiating the heat necessary to cook food. There are many different charcoal grill configurations. Some grills are square, round, or rectangular, some have lids while others do not, and some may or may not have a venting system for heat control.

A popular design for charcoal grills is the kettle-type design. The kettle-type design allows the griller to configure the grill for indirect cooking (or barbequing) as well. For indirect cooking, charcoal is piled on one (1) or both sides of the lower chamber and a water pan is placed in the empty space to one (1) side or between the charcoals. Food is then placed over the water pan for cooking. The venting system can consist of one (1) or more vents in the bottom of the lower chamber and one (1) or more vents in the top of the lid. Normally, the lower vent(s) are to be left open until cooking is complete, and the vent(s) in the lid are adjusted to control airflow. Restricted airflow means lower cooking temperature and slower burning of charcoal. Configuring a standard kettle grill for multiple cooking zones is not always convenient. A suitable solution is desired.

Various attempts have been made to solve problems found in barbeque grill accessory art. Among these are found in: U.S. Pat. App. Pub. Nos. 2009/0139511 to Dalrymple; 2016/0262569 to Parrish, et al.; and 2006/0042475 to Craig. These prior art references are representative of barbeque grill accessories.

None of the above inventions and patents, taken either singly or in combination, is seen to describe the invention as claimed. Thus, a need exists for a reliable kettle grill heat dispersion device, and to avoid the above-mentioned problems.

SUMMARY OF THE INVENTION

The inventor has recognized the aforementioned inherent problems and lack in the art and observed that there is a need for a reliable heat dispersal unit particularly suited for use with a kettle grill.

It is therefore an object of the invention to provide such a unit, that has a body defining an interior, a body open top, a body open bottom, a mesh screen secured about the body open bottom, and a body side wall. A tray portion coextensive with a perimeter of the open top also exists. An insert having an insert open top, an insert closed bottom, and an insert side wall is configured to removably nest within the body. The entire unit is configured to rest within a cooking vessel, such as a grill, and in at least one (1) embodiment, within a kettle-style grill.

It is a further object of the invention to provide a cylindrical body, a cylindrical insert, and a circular tray portion. In certain embodiments, the diameter of the tray is less than a diameter of an inner surface of the grill. In other embodiments, the height of the body is less than the depth of the grill.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
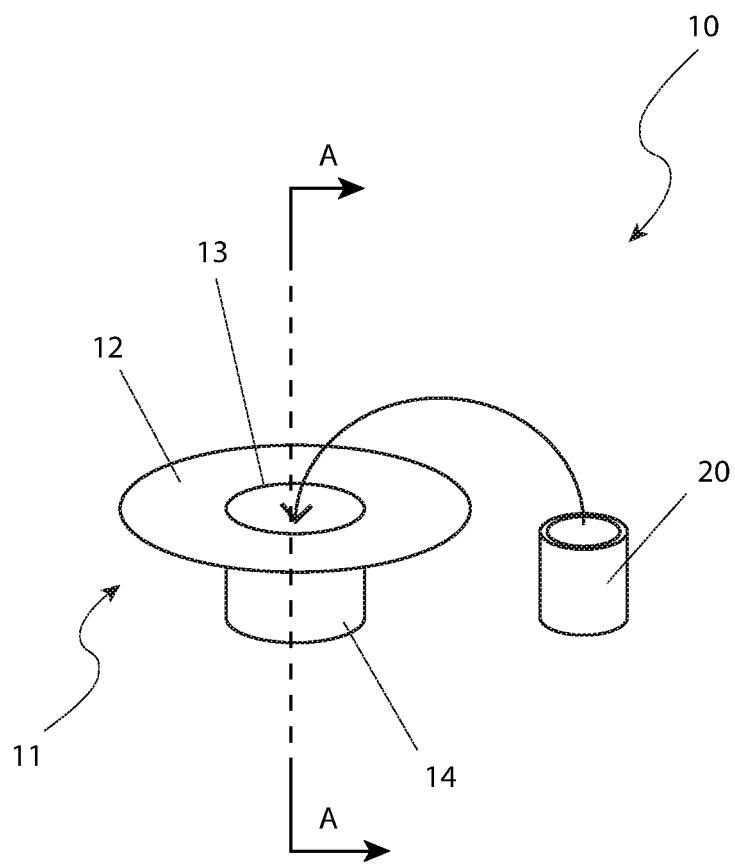
FIG. 1 is a side perspective view of an outdoor grill accoutrement 10 illustrating a grill partition 11 and an insert 20, according to a preferred embodiment of the present invention.

DESCRIPTIVE KEY 10 outdoor grill accoutrement
11 grill partition
12 plate
13 aperture
14 cylinder
16 bottom
20 insert
25 gap
30 existing grill
31 cooking rack
32 fuel grate
40 fuel
45 heat
50 food stuff

DETAILED DESCRIPTION OF THE PREFERRED EMBODIMENT

The best mode for carrying out the invention is presented in terms of its preferred embodiment, herein depicted within FIG. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes an outdoor grill accoutrement (herein described as the "device") 10, which provides a grill partition 11 being particularly suited for insertion within an existing kettle-type outdoor grill 30. In one (1) embodiment, a side view of the grill partition 11 indicates a shape similar to an inverted top hat, and having a central removable insert 20.

Figure 2:
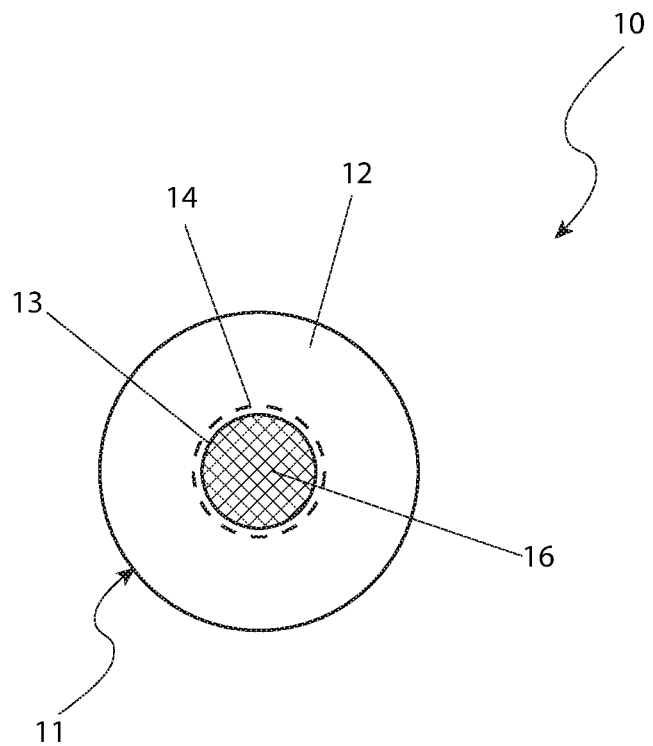
FIG. 2 is a top plan view of the outdoor grill accoutrement 10 illustrating the grill partition 11, according to an embodiment of the present invention.

Referring now to FIGS. 1 and 2, side perspective and top views of the grill partition 11 and insert 20 portions, according to a preferred embodiment of the present invention, are disclosed. The grill partition 11 provides a unitary weldment which includes a horizontal donut-shaped plate 12 having a circular center aperture portion 13 to which a top edge portion of a downwardly extending cylinder 14 is welded or otherwise attached. The circular plate portion 12 and cylinder 14 portions of the grill partition 11 are shaped so as to be placed within an existing kettle-shaped grill 30 (see FIGS. 3 and 4). The plate 12 and cylinder 14 portions are envisioned to be made using a carbon steel, stainless steel, or other metal plate material which can withstand continuous high heat conditions.

The cylinder 14 provides an open top portion and a circular bottom portion 16, which may be solid or covered in mesh and also being capable of withstanding continuous high heat conditions, and being welded along perimeter edges to corresponding bottom edge portions of the cylinder 14. The bottom 16 is preferably made using an expanded sheet metal material.

The insert 20 is envisioned to be made using a similar material as the grill partition 11, being sized so as to be slidingly inserted into the cylinder 14 in a circumscribed manner. The insert 20 is removably placed inside of the cylinder 14 being intended to act as a divider, a water retention reservoir, or a grease catcher, depending upon the particular cooking method being performed.

As seen in FIG. 1, the size and shape of the grill partition 11 is to be relative to that of the insert 20. This view illustrates the manner in which the insert 20 may be placed into the cylinder portion 14 of the grill partition 11. The insert 20 provides a cylinder-shaped vessel having a closed bottom portion. Seen in FIG. 2, are the donut-shaped plate 12 and the retaining bottom 16 portions of the grill partition 11.

Figure 3:
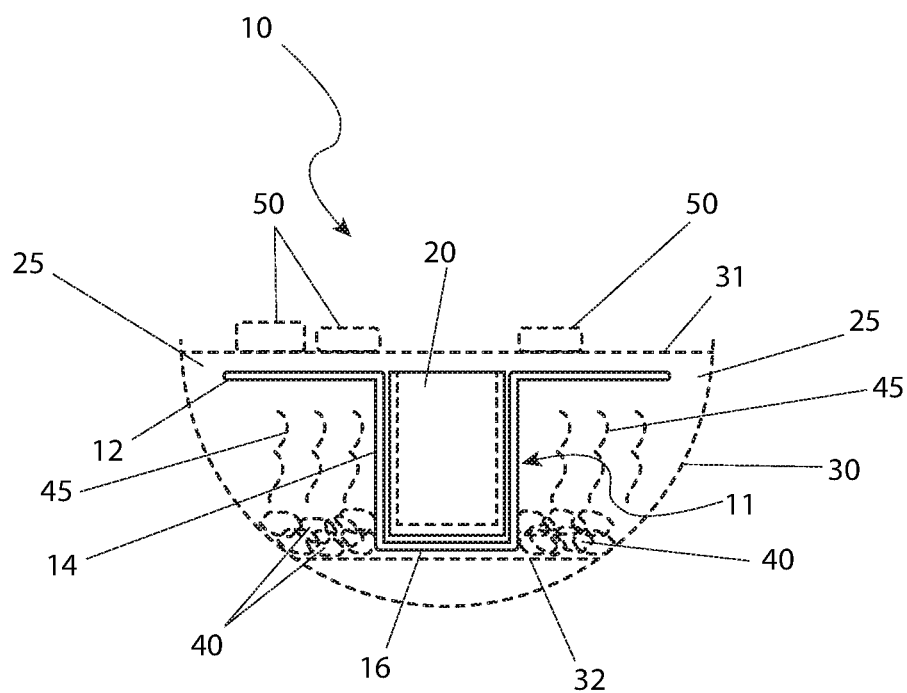
FIG. 3 is a front cut-away view of the outdoor grill accoutrement 10 taken along section line A-A (see FIG. 1), depicting an "in-use" state while performing an indirect cooking process, according to a preferred embodiment of the present invention; and, FIG. 4 is another front cut-away view of the outdoor grill accoutrement 10 taken along section line A-A (see FIG. 1), depicting a direct cooking process, according to a preferred embodiment of the present invention.

Referring now to FIG. 3, a front cut-away view of the device 10 taken along section line A-A (see FIG. 1), depicting an "in-use" state while performing an indirect cooking process, according to a preferred embodiment of the present invention, is disclosed. The centrally-located cylinder 14 portion of the grill partition 11 protrudes down toward, and sits upon, a fuel grate portion 32 located near a bottom portion of the existing grill 30. As illustrated here, the grill partition 11 is placed within the existing grill 30 with the removable insert 20 being placed within the centrally-located cylinder 14. In this configuration, a quantity of fuel 40 such as charcoal is then positioned outside the cylinder 14 and beneath the plate 12, thereby utilizing he device 10 to perform an indirect grilling method. The perimeter edges of the donut-shaped plate 12 rest within the existing grill 30 just below a main cooking rack portion 31 of the existing grill 30. It is preferred that the diameter of the plate 12 be less than the diameter of the inner surface of the existing grill 30, such that a circumferential gap 25 is defined between the plate 12 and the inner surface of the existing grill 30. It is envisioned that the gap 25 would have a width of up to one inch (1 in.).

In the embodiment shown here, the cooking fuel 40 is selectively dispersed on the subjacent fuel grate portion 32 of the existing grill 30 around the outer wall of the cylinder 14 to allow for a variety of cooking options and methods to be employed simultaneously. The heat 45 generated from the fuel 40 results in both radiant and conducted heat from the plate portion 12 which in turn effects food stuffs 50 positioned upon the superjacent cooking rack 31. Coincidentally, the heat 45 may be utilized to heat water within the insert 20 during grilling, if desired, to balance a temperature of the grilling process during extended cooking durations.

Figure 4:
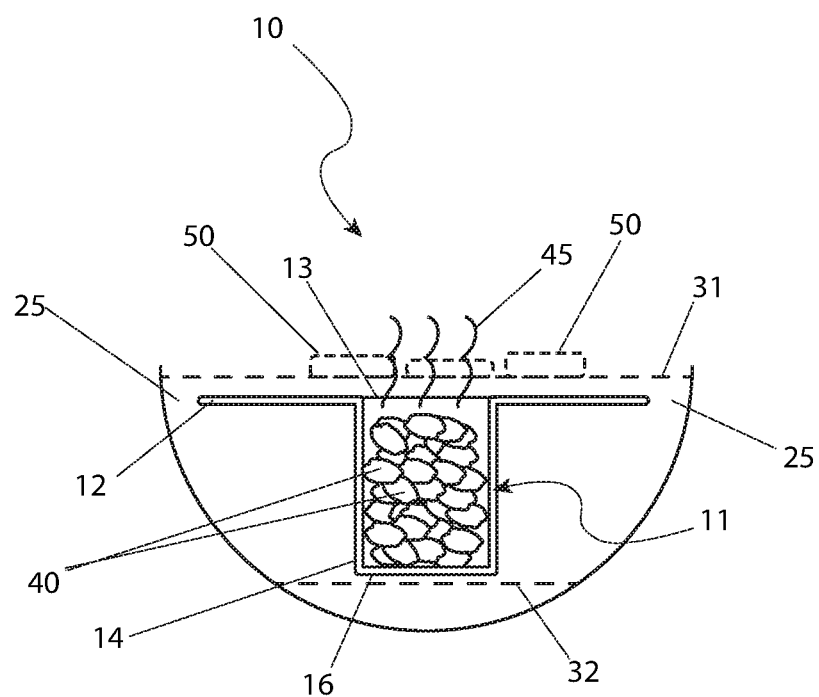

Referring now to FIG. 4, another front cut-away view of the device 10 taken along section line A-A (see FIG. 1), depicting a direct cooking process, according to a preferred embodiment of the present invention, is disclosed. The grill partition portion 11 is illustrated here within the existing grill 30, and a quantity of fuel 40 has been placed within the cylinder 14. In this embodiment, the insert 20 would be removed and replaced with the cooking fuel 40 of choice. This configuration allows for a more centralized or focused cooking approach, as heat 45 generated by the fuel 40 acts directly upon the food stuffs 50 positioned upon a center portion of the cooking rack 31. The illustrated embodiment would still allow for other cooking methods to be used upon the fuel grate 32 and/or around the perimeter portions of the cooking rack 31.

The exact specifications, materials used, and method of use of the kettle grill top hat system may vary upon manufacturing.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 1.

The method of configuring and utilizing the device 10 to perform an indirect cooking method may be achieved by performing the following steps: procuring a model of the device 10 which includes a plate portion 12 having an outer diameter which corresponds to the diameter of an existing kettle-shaped grill 30, so as to result in a desired gap 25 in between; removing the cooking rack portion 31 of the existing grill 30; distributing a quantity of fuel 40 such as charcoal, upon outer edge portions of the fuel grate 32; placing the grill partition portion 11 of the device 10 into the existing grill 30 such that the cylinder portion 14 rests upon a center portion of the fuel grate 32; placing the insert 20 into the cylinder 14 to provide a desired water reservoir or grease catcher function; lighting the fuel 40 in a normal manner; replacing the cooking rack 31; loading desired food stuffs 50 upon the cooking rack 31; allowing a user to assist in the cooking of the food stuffs 50; and, benefiting from performing an indirect cooking method to grill the food stuffs 50, afforded a user of the present invention 10.

The method of configuring and utilizing the device 10 to perform a direct cooking method may be achieved by performing the following steps: removing the cooking rack portion 31 of the existing grill 30; placing the grill partition portion 11 of the device 10 into the existing grill 30 such that the cylinder portion 14 rests upon a center portion of the fuel grate 32; removing the insert 12 from the cylinder 14, if present; pouring a quantity of fuel 40 such as charcoal, into the cylinder 14; lighting the fuel 40 in a normal manner; replacing the cooking rack 31; loading desired food stuffs 50 upon the cooking rack 31 at a desired proximity to the fuel 40 within the cylinder 14; allowing the heat 45 generated by the fuel 40 to act directly upon the food stuffs 50; and, allowing the food stuffs 50 to be grilled using a more centralized or direct cooking approach. It is also understood that this configuration would allow for separate or coincidental cooking methods utilizing fuel 40 placed upon the fuel grate 32 and additional food stuffs 50 being placed upon perimeter portions of the cooking rack 31.

Finally, it is understood that the plate 12 may also, in some methods of use, be utilized directly as a cooking surface in lieu of, or in combination with, the cooking rack portion 31 of the existing grill 30.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A kettle grill heat dispersion device, comprising:
 a body defining an interior, comprising:
  a body open top;
  a body open bottom;
  a mesh screen secured about said body open bottom;
  a body side wall; and
  a tray portion coextensive with a perimeter of said open top;
 a cylindrical insert;
 wherein said kettle grill heat dispersion device is configured to rest within a kettle grill;
 wherein said body is cylindrical;
 wherein said tray portion is circular;
 wherein a diameter of said tray portion is less than a diameter of an inner surface of said kettle grill; and
 wherein a height of said body is less than a depth of said kettle grill.

2. The device of claim 1, further comprising a plate is made of material selected from the group consisting of carbon steel, stainless steel, or other metal plate material which withstands continuous high heat conditions.

3. The device of claim 1, wherein said bottom is made of an expanded sheet metal material.

\* \* \* \* \*